Inventor
Hans U. Lieberherr by Parker & Carter
Attorneys

Inventor
Hans U. Lieberherr by Parker & Carter
Attorneys

United States Patent Office 2,952,968
Patented Sept. 20, 1960

1

2,952,968

TWO CYCLE SUPERCHARGING ON PORT SCAVENGED ENGINES

Hans U. Lieberherr, Milwaukee, Wis., assignor to Nordberg Manufacturing Company, Milwaukee, Wis., a corporation of Wisconsin Filed Mar. 24, 1955, Ser. No. 496,519

3 Claims. (Cl. 60—13)

My invention is in the field of internal combustion engines and is generally applicable to a compression ignition or diesel engine, a gas or spark-fired engine, and to various other well-known types.

A primary object of my invention is a two-cycle port-scavenged engine with means for rejecting a part of the entrapped air from the cylinder back to the inlet side or inlet manifold.

Another object is an engine of the above type in which the rejected air is cooled before it is returned to the inlet side.

Another object is an engine of the above type in which the quantity of air rejected is varied in accordance with the load on the engine.

Another object is a two-cycle supercharged, intercooled engine adapted to have an expansion ratio substantially greater than the compression ratio at full load and all heavy loads, without unnecessarily cooling and diluting the exhaust gases for the exhaust turbine.

Another object is a two-cycle port-scavenged engine of the above type with an auxiliary valve and port for the cylinder head with an auxiliary duct leading back to the inlet side, either ahead of or behind the intercooler, and means for timing the closing of the auxiliary valve in relation to the load.

Another object is a two-cycle engine of the above type with an auxiliary valve box for each cylinder in the inlet manifold, communicating with the cylinder, and having a valve therein to control the amount of air rejected or returned to the inlet manifold during the compression stroke of the piston.

Another object is a supercharged, intercooled two-cycle port-scavenged engine with means for rejecting a quantity of air from the cylinders back to the inlet side between the exhaust driven supercharger and the intercooler.

Another object is a two-cycle engine of the above type with provision for a conventional booster or blower.

Another object is an engine of the above type adapted to maintain a substantially constant air-fuel ratio during load changes.

Another object is an engine of the above type with means for filtering the rejected air.

Another object is a method of operating a supercharged port-scavenged two-cycle engine.

Other objects will appear from time to time in the ensuing specification in which.

2

Figure 4:
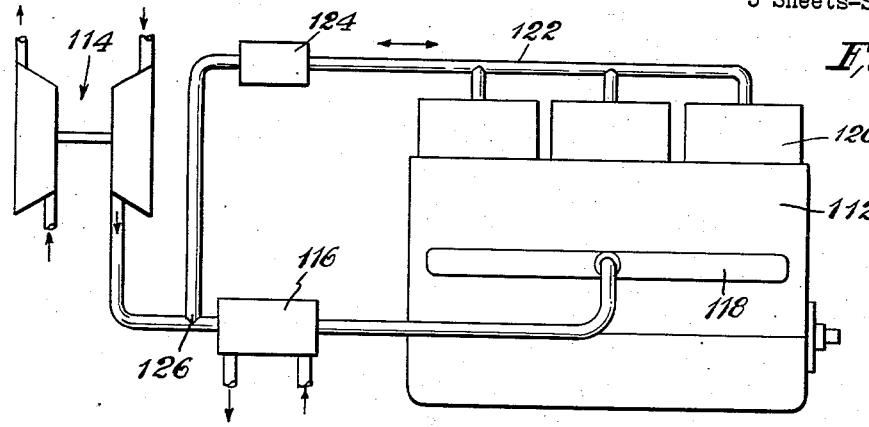
Figure 4 is a diagrammatic engine layout for the form in Figure 1.
Figure 5:
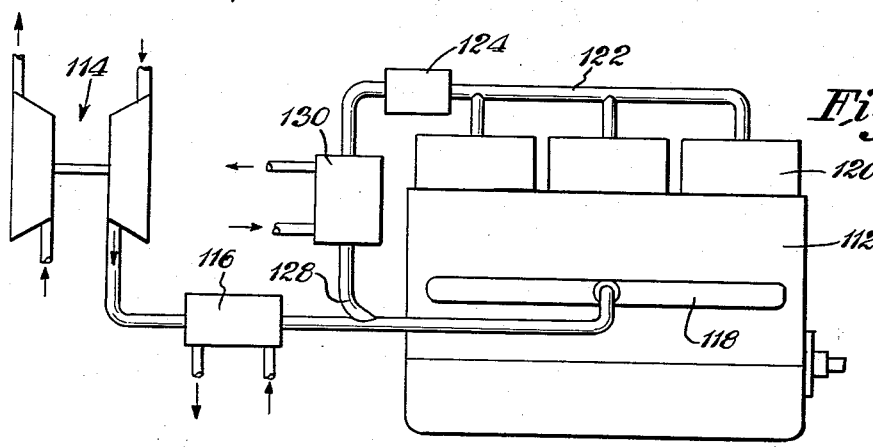
Figure 6:
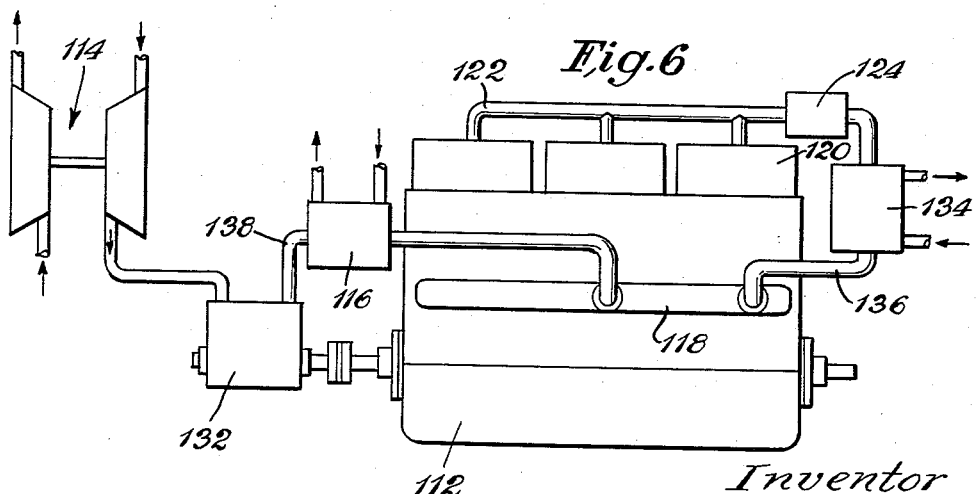
Figure 7:
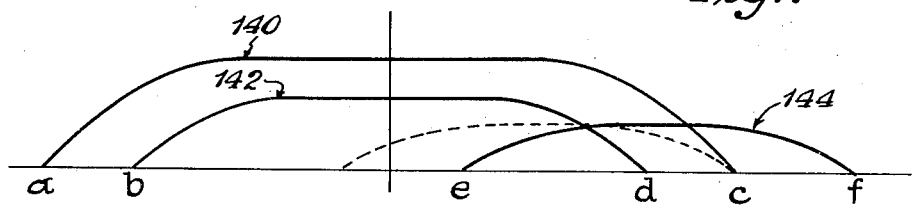
Figure 8:
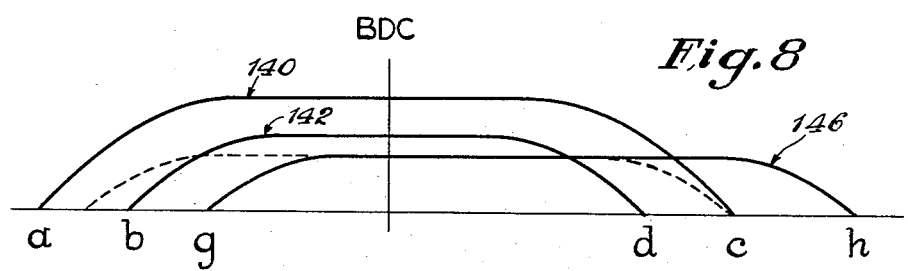
Figure 9:
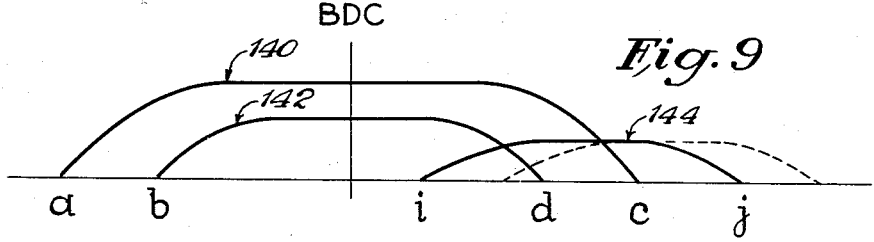
Figure 10:
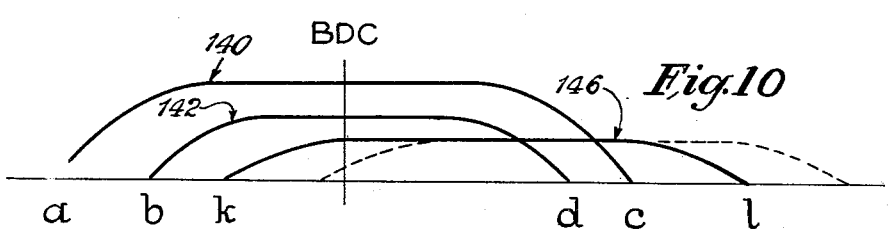

Figure 5 is a modified form of Figure 4;

Figure 6 is still another form of the invention;

Figure 7 is a valve timing diagram for the auxiliary valve of the engines shown in Figures 1 through 6 for diesel or compression ignition operation;

Figure 8 is another valve timing diagram for diesel or compression ignition operation similar to Figure 7;

Figure 9 is a valve timing diagram for the engines shown in Figures 1 through 6 for gas operation; and Figure 10 is another valve timing diagram for gas operation similar to Figure 9.

Figure 1:
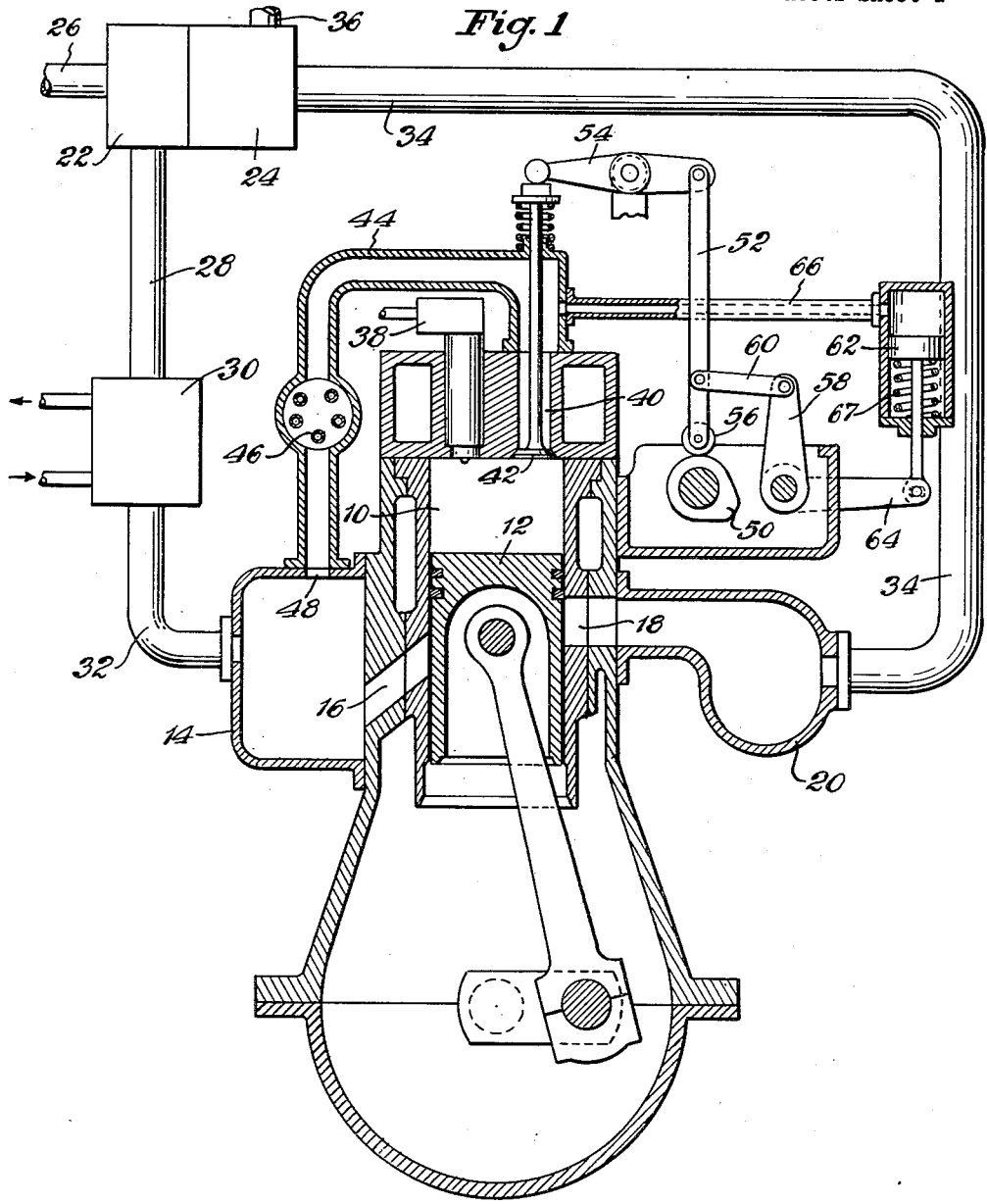
Figure 1 is a diagrammatic vertical section of a two-cycle port-scavenged engine with my invention.

In Figure 1, I have shown a two-cycle engine with a cylinder 10 and piston 12 having the usual connecting rod, crankshaft, crankcase, and the like. The cylinder has the usual inlet manifold 14 connected, through suitable inlet ports 16, with the cylinder and exhaust ports 18 leading to an exhaust manifold 20.

A compressor 22 coupled to an exhaust driven turbine 24 draws air in through a suitable inlet 26 and, after compressing it, discharges it through a suitable connection 28 to an intercooler 30 where the heat of compression is withdrawn. From the intercooler, the air flows through a suitable connection 32 to the inlet manifold and then to the cylinders. The exhaust gases from the exhaust manifold are carried by a suitable exhaust connection 34 to the turbine of the exhaust driven blower and discharged through a suitable outlet 36. The cylinder head is shown as provided with a suitable injection nozzle 38 of any conventional type or any suitable fuel admitting means, such as a gas valve or the like.

The cylinder head is shown with an auxiliary port or opening 40 controlled by an auxiliary or compression control valve 42 which communicates by a suitable auxiliary connection 44 through an auxiliary intercooler 46 with the inlet manifold at 48. The valve 42 is spring biased closed in the usual manner and may be controlled by a cam 50 through a push rod 52 and rocker arm 54, the cam being suitably geared or otherwise connected to the crankshaft so that it is rotated in timed relation to the engine. A follower roller 56 on the push rod is shown as variably positioned on the cam by a rocker arm 58 and link 60, the rocker arm being controlled by a cylinder and piston 62 pinned to an arm 64 extending from the arm 58. The upper chamber of the cylinder communicates with the auxiliary connection 44 through a suitable conduit or pipe 66. The pressure of the air in the auxiliary conduit 44 biases the piston in one direction while a suitable spring 67 or the like, biases it in the other, the lower chamber of the cylinder being suitably vented.

By this structure, during the compression stroke of the piston, the auxiliary valve 42 may be opened and closed by the cam 50 in timed relation to the load with the time of opening and closing of the valve 42 being changed as the load changes. Thus a part of the entrapped air in the cylinder will be returned to the inlet manifold 14 through the auxiliary connection 44 and cooler 46.

The scavenging and supercharging air in the cylinder during scavenging will mix with the exhaust gases and a residual amount of burnt gas will be entrapped. The rejected air from the cylinder in the auxiliary connection 44 will be at a higher temperature than the cool air from the intercooler 30. This air will again be taken down approximately to the temperature of the intercooler outlet air by the auxiliary cooler 46.

Figure 2:
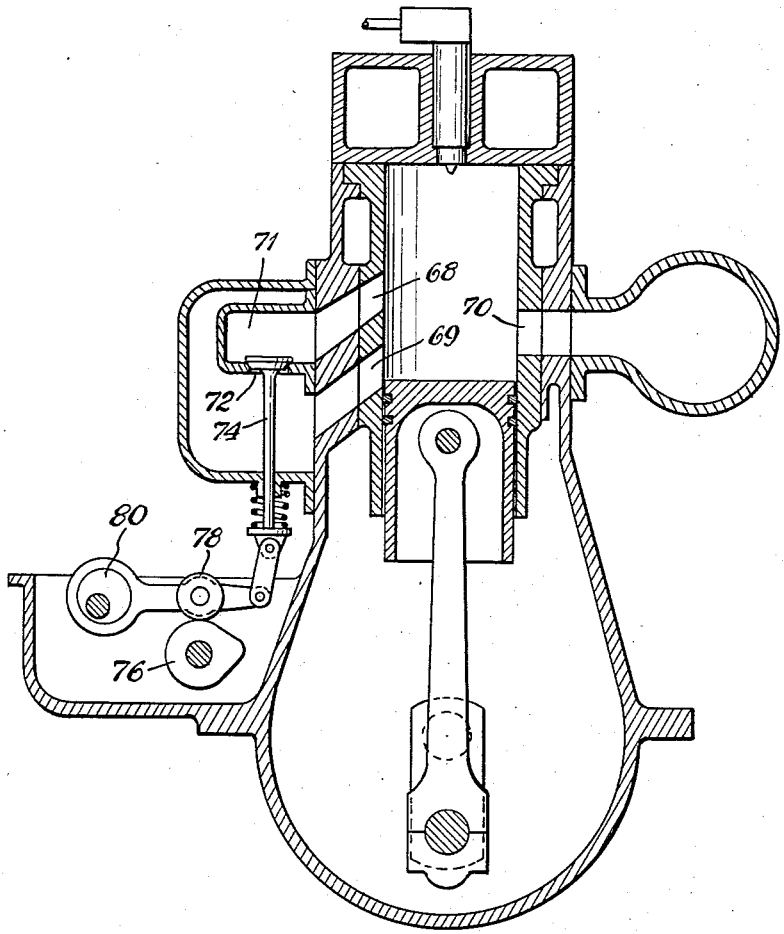
Figure 2 is a modified form with parts omitted for clarity.

In Figure 2, I have shown a modified form of the invention in which the auxiliary connection or port is shown in the form of one or more openings 68 above the normal inlet and exhaust ports 69 and 70. The rejected air from the cylinder flows into a valve box 71 confined in the inlet manifold and flows through a suitable port 72 into the manifold controlled by one or more auxiliary valves 74. The valve may be actuated by a cam 76 through a follower 78 which is variably positioned on the cam by an eccentric 80. The eccentric may be rotated to vary the timing of the valve 72 in relation to the load by a mechanism similar to the cylinder and piston 62 and connection 66 in Figure 1, although any other suitable load responsive mechanism could be used to change the time of the valve 72 or to oscillate the eccentric 80. The Figure 2 modification may also include the supercharger and intercooler shown in Figure 1, although this structure has not been illustrated.

Figure 3:
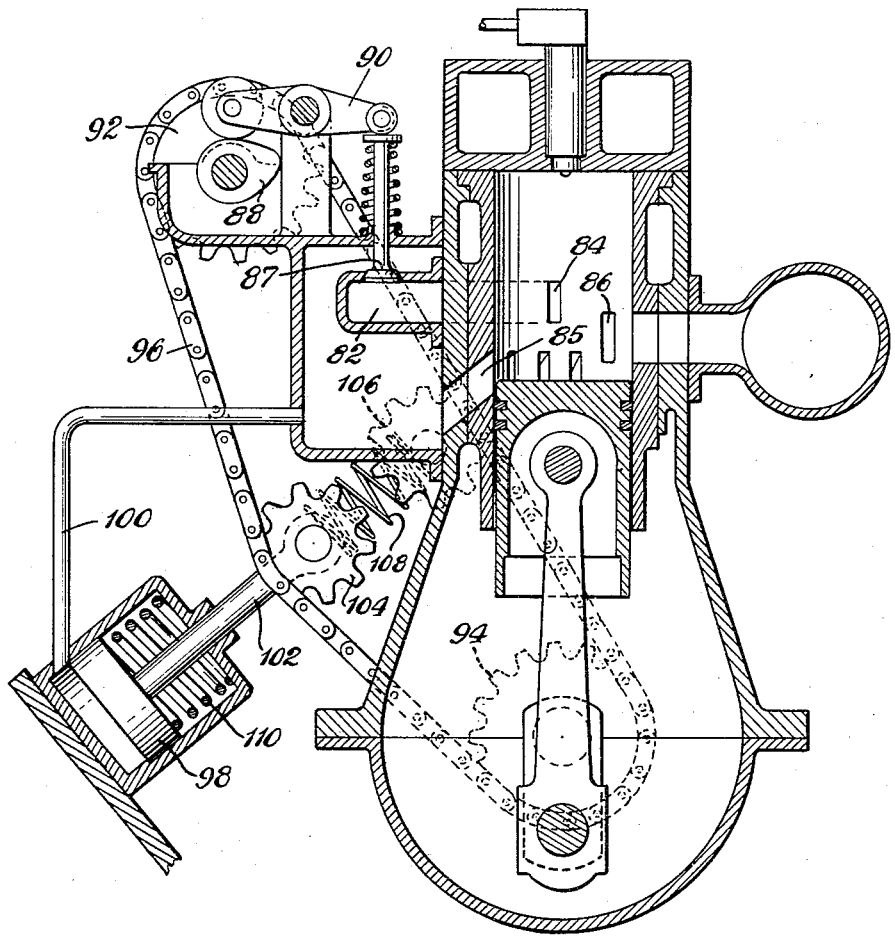
Figure 3 is another form of the invention with parts omitted for clarity.

In Figure 3, I have shown another form of the invention in which a two-stroke cycle port-scavenged engine has a valve box 82 in the inlet manifold which communicates with the cylinder through one or more suitable ports 84 above the normal inlet and exhaust ports 85 and 86. The rejected air will be controlled by one or more auxiliary valves 87 which may be actuated by a cam 88 through a suitable rocker arm 90. The cam is driven from the crankshaft by pinions 92 and 94 and a chain 96, or the like. The variable timing of the valve 27 may be effected by varying the drive between the crankshaft and cam 88 through a cylinder and piston 98 actuated by the inlet air pressure through a connection 100.

The piston rod 102 carries idlers 104 and 106 which are biased apart by a suitable spring 108 or the like to take up the slack in the chain 96. The pressure of the air from the inlet manifold tends to move the piston, and the followers, in one direction, while the spring 110 biases them in the other direction. Thus the inlet manifold pressure will vary the phase angle between the cam 88 and the drive shaft to change the timing of the auxiliary valve 87.

In all three forms, the specific mechanism for timing the auxiliary valve or valves is unimportant. Suffice it to say that any suitable mechanism responsive to the load on the engine may be provided to actuate the valve in a particular timed relationship to the load.

In Figures 4, 5 and 6, I have shown three engine layouts. In all three figures, I have shown a two-cycle engine 112 with an exhaust driven supercharger 114 supplying high pressure air through an intercooler 116 to the inlet manifold 118. The compression control valves in the cylinder heads 120 provide for the rejection of air to a return passage or conduit 122 and a suitable filter 124 to the inlet side of the system.

In Figure 4, the rejected air is returned to the inlet line at 126 ahead of the intercooler 116. Thus the air rejected from the cylinders will again be cooled by the normal intercooler before it is again admitted to the inlet manifold.

In Figure 5, the auxiliary return or injection line 122 communicates with the outlet side of the intercooler at 128 and has an auxiliary intercooler 130 to cool the air before returning it to the inlet manifold.

In Figure 6, the high pressure air outlet from the exhaust driven supercharger leads to a crankshaft driven booster or scavenging blower 132, which is standard equipment in a two-cycle engine. The pressure of the air is further increased in the blower and the air is then passed through the intercooler 116 to the inlet manifold. The air rejected from the cylinder by the auxiliary valve mechanism is carried by the line 122 to an auxiliary intercooler 134 where the heat from the residual burnt gases is removed and it is then returned to the inlet manifold by a suitable connection 136.

By comparison, it will be apparent that in Figure 6, the return line 122 could be connected through the filter 124 directly to the line between the booster and the intercooler, as at 138, so that the auxiliary intercooler 134 would not be necessary. This arrangement would be similar to Figure 4 except that the booster is present. In Figures 4, 5 and 6, I have omitted the connection between the exhaust driven supercharger and the exhaust manifold, although it can be present.

In each case the compression control valve could be controlled by the mechanism shown in Figure 1 or Figure 3, or any other suitable mechanism which would time the closing of the valve in relation to the load.

In Figures 7 and 8 I have shown two timing diagrams for my invention in all forms as applied to a compression ignition or diesel engine.

In Figure 7 the timing 140 of the exhaust ports overlies the inlet port timing 142 in the normal manner, the exhaust ports opening at $a$ ahead of the inlet ports at $b$ during the expansion stroke of the piston and closing at $c$ after the inlet ports close at $d$ during the compression stroke. The compression control valve timing 144 is such that it opens at $e$ after bottom dead center (BDC) and closes at $f$ after the exhaust ports have been closed, when the engine is at full load. The closing point $f$ indicates approximately the position of the piston in Figure 1. Thus the auxiliary valve does not open until the piston has started its compression stroke and does not close until after the exhaust ports are covered by the piston. A portion of the air normally entrapped in the cylinder by the closing of the exhaust ports at $c$ will be rejected back into the inlet side through the auxiliary passage until the auxiliary valve closes at $f$. The amount or quantity of air that is rejected can be varied by the valve actuating mechanism which responds to the load.

It should be noted that as the load decreases, the pressure of the air in the inlet manifold as supplied by the exhaust driven supercharger will decrease. This air pressure is communicated to the cylinder and piston 62 through the conduit 66 in Figure 1 and the auxiliary connection 44. Thus as the load decreases, the closing point $f$ of the auxiliary valve will be advanced and a smaller amount of air will be rejected from the cylinder back to the inlet manifold and more air will be entrapped in the cylinder. At no load the timing of the auxiliary valve may be shifted to the dotted line position in Figure 7, point $f$ approximately coinciding with point $c$, and a full cylinder volume will be retained for compression.

The density of the air being supplied by the exhaust driven supercharger will increase with increasing load, and even though the volume ultimately entrapped in the cylinder after the auxiliary valve closes is less with increasing load, the total weight of air will be greater. Thus more fuel can be burned in the cylinder and more load can be carried by the engine, without exceeding the safe maximum pressure.

In Figure 8, the timing of the exhaust ports and the inlet ports is designated as in Figure 7. The compression control valve timing 146 is such that the valve opens at $g$ and closes at $h$. Thus scavenging will take place through the auxiliary port, as well as through the main inlet ports. During the compression stroke of the piston when the engine is at full load, the auxiliary valve is held open and is not closed until at point $h$ after the inlet and exhaust ports have been covered by the piston. Thus a portion of the entrapped air in the cylinder will be rejected back to the inlet side. As in Figure 7, the time of closing of the valve at $h$ can be varied so that the volume entrapped will vary in relation to the load. At no load the timing of the auxiliary valve has shifted to the dotted line position so that a full cylinder volume is entrapped. The density of the inlet air from the exhaust driven supercharger increases as the load increases, so that the total weight of air entrapped also increases as the load increases even though the volume is reduced.

In Figures 9 and 10 I have shown two additional timing diagrams for my invention as embodied in Figures 1 through 6 and as applied to a gas fuel engine, either spark or pilot fuel ignited. In a gas engine, it is desirable that the air-fuel ratio be maintained approximately constant as the load varies. Air is admitted to the cylinders through the inlet ports in the usual manner and fuel is admitted through a suitable gas valve in the cylinder head, as at 38 in Figure 1. The compression control valve can be timed so as to entrap a quantity of air in relation to the load and in relation to the quantity of fuel that is admitted so that the air-fuel ratio of the mixture will remain constant for all loads.

As an example, in Figure 9 the inlet and exhaust port timings are again designated by 140 and 142. At full load the auxiliary valve is timed to open at $i$ after bottom dead center and to close at $j$ after the piston has covered the exhaust ports at $c$, the time of opening and closing of the auxiliary valve corresponding approximately to those shown in Figure 7. But to maintain a constant air-fuel ratio, as the load decreases, the timing is retarded until the opening and closing times are indicated by the dotted line position in Figure 9, both being substantially retarded from the full load timing. Therefore, at no load, substantially less air is entrapped in the cylinder than at full load and the timing is such as to maintain a constant air-fuel ratio.

In Figure 10, the time of opening of the auxiliary valve at $k$ is before bottom dead center and the auxiliary port aids in scavenging. The closing time $l$ for full load is after the point $c$ at which the piston covers the exhaust ports and substantially less than the full volumetric capacity of the cylinder is entrapped for compression. As before, these points correspond generally to those in Figure 8. However, as the load decreases, the timing will be retarded as in Figure 9 to the dotted line position which represents generally the no load position.

It should be understood that the timing of the compression control valve on a gas engine could be advanced, retarded, held constant, or any combination of these as the load changes, and Figures 9 and 10 are only given as examples. The important point is that the time of closing of the auxiliary valve at full load is such as to entrap a volume which is substantially less than the full cylinder volume and as the load changes, the timing of the valve is such as to entrap sufficient air to provide a mixture in the cylinder with an approximately constant air-fuel ratio. Depending upon the particular valve timing desired, any suitable valve timing mechanism could be provided, if such is necessary.

While I have shown and described the preferred form and several modifications of my invention, it should be understood that various modifications, alterations and changes can be made without departing from the fundamental theme of my invention and I desire that the invention be unrestricted except as by the appended claims.

The use, operation and function of my invention are as follows:

My invention is particularly applicable to supercharged two-cycle engines of the port-scavenged type in that it provides for the rejection of a part of the entrapped air from the cylinders back into the inlet side. The amount of air or volume rejected can be varied by any suitable mechanism in relation to the load, so that the volume remaining in the cylinder is related to the load in a predetermined manner. The engine may be provided with an exhaust driven supercharger and the high pressure air from it is cooled so that the density of the air supplied to the cylinder varies in direct relation to the load. By my invention, the rejected air from the cylinder is returned to the inlet side and the exhaust gases are not diluted with cool air which would decrease the energy available for the exhaust driven supercharger. Furthermore, as less air will be expelled into the exhaust, a smaller supercharging blower will be sufficient for delivering the same air content for the cylinders.

As the auxiliary port communicates with the inlet side of the engine, scavenging will be substantially increased. In the case of the valve timing in Figures 8 and 10, scavenging will be additionally increased as the auxiliary port is uncovered before bottom dead center. In the case of Figure 1, the auxiliary valve is advantageously located at the exhaust side so that the exhaust gas down stream is improved by a scavenging air down stream.

If the invention is applied to a diesel engine, the valve timing is such as to entrap a volume of air which varies in inverse relation to the load over the entire load range or only over a selected part of the range, for example, from one-half to full load. At full load in Figures 7 and 8, the volume entrapped is represented by points $f$ and $h$, this being substantially less than the full volumetric capacity of the cylinder. At no load the volume entrapped is represented by the point $c$ in both figures and a sufficiently high final compression temperature will be obtained to ignite the fuel during starting and at light loads. Even though the volume is decreased as the load rises, nevertheless the density and weight of air entrapped increases and more fuel can be burned.

When the invention is applied to a gas engine, at full load substantially less than the full volumetric capacity of the cylinder is entrapped as represented by the points $j$ and $l$ in Figures 9 and 10. As the load decreases, the timing of the auxiliary valve is such as to maintain a constant air-fuel ratio in the cylinders. In Figures 9 and 10 I have shown a timing for the compression control valve such that the volume entrapped for compression will vary in direct relation to the load. This is only exemplary and any timing could be used that would result in the entrapment of a mixture with a constant air-fuel ratio.

In this case it will be understood that a conventional gas valve, or the like, with a spark plug or any suitable ignition means, could be used in place of the injector shown in Figures 1, 2 and 3, or, in the case of a dual fuel engine, both a gas valve and injection nozzle could be present.

I claim:

1. In a loop scavenged two-stroke cycle internal combustion engine, a cylinder and piston, inlet and exhaust ports around the wall of the cylinder so that scavenging air will enter the inlet ports, loop up around the top of the cylinder, and leave through the exhaust ports, the ports being opened and closed by the piston, an inlet air system for the engine including an exhaust driven supercharger and an intercooler, the supercharger having a compressor connected to the intercooler which is in turn connected to the inlet ports of the cylinder so that compressed cooled air will be supplied to the cylinder, the supercharger including a turbine connected to the exhaust ports so that hot exhaust gases will be supplied from the cylinder to the turbine to drive it, an auxiliary valve and port for the cylinder communicating with the inlet side, and a valve actuating mechanism for operating the auxiliary valve in timed relationship to the cyclical operation of the engine so that, when the engine is at full load, the auxiliary valve will be closed late during the piston's compression stroke and a substantial quantity of compressed cooled air that would otherwise be entrapped in the cylinder by the piston covering the inlet and exhaust ports during its compression stroke will be rejected through the auxiliary port to the inlet side to sustain the exhaust driven supercharger.

2. The structure of claim 1 further characterized in that the auxiliary port communicates with the inlet air system at a point between the supercharger and the intercooler so that the rejected quantity of compressed cooled air will pass through the intercooler again and any heat picked up by the air from the cylinder walls or otherwise will be removed before it is reintroduced into the cylinder.

3. The structure of claim 1 further characterized in that the auxiliary port communicates with the inlet air system by a passage which opens into the inlet air system at a point between the intercooler and the cylinder, and further including an auxiliary intercooler in the passage so that the rejected quantity of compressed cooled air will pass through the auxiliary intercooler and heat picked up by the air from the cylinder walls or otherwise will be removed by the auxiliary intercooler before the air is reintroduced into the cylinder.

References Cited in the file of this patent

UNITED STATES PATENTS

| | | |
|---|---|---|
| 1,046,738 | Cross | Dec. 10, 1912 |
| 1,160,419 | Lawrence | Nov. 16, 1915 |
| 1,301,807 | Boutielle | Apr. 29, 1919 |
| 1,330,496 | Ruegg | Feb. 10, 1920 |
| 1,384,133 | Howe | July 12, 1921 |
| 1,741,729 | Newton | Dec. 31, 1929 |
| 1,788,076 | Zaikowsky | Jan. 6, 1931 |
| 1,839,791 | Lawrence | Jan. 5, 1932 |
| 1,869,455 | Zaikowsky | Aug. 2, 1932 |
| 2,097,883 | Johansson | Nov. 2, 1937 |
| 2,292,233 | Lysholm | Aug. 4, 1942 |
| 2,293,548 | Johansson | Aug. 18, 1942 |
| 2,401,188 | Prince | May 28, 1946 |
| 2,509,246 | Ramsey | May 30, 1950 |
| 2,670,595 | Miller | Mar. 2, 1954 |

FOREIGN PATENTS

| | | |
|---|---|---|
| 566,531 | Great Britain | Jan. 3, 1945 |